United States Patent

[11] 3,628,609

| [72] | Inventor | Wilbur H. Graybill |
| | | R.D. No. 2, Lititz, Pa. 17543 |
| [21] | Appl. No. | 848,993 |
| [22] | Filed | Aug. 11, 1969 |
| [45] | Patented | Dec. 21, 1971 |

[54] HARVESTING MACHINE
9 Claims, 7 Drawing Figs.

[52] U.S. Cl. .................................................. 171/14, 171/27
[51] Int. Cl. ........................................... A01d 17/22
[50] Field of Search ............................................ 171/14, 17, 18, 28, 27; 209/136, 137, 21, 26, 27, 34, 35; 56/327; 130/21

[56] References Cited
UNITED STATES PATENTS

| 3,473,613 | 10/1969 | Boyce ........................... | 171/14 |
| 1,032,175 | 7/1912 | Baas ............................. | 171/18 |
| 1,917,536 | 7/1933 | McIntire ....................... | 130/21 |
| 3,106,522 | 10/1963 | Dauenhauer ................. | 209/307 |
| 3,340,935 | 9/1967 | Csimma ........................ | 56/327 R |
| 3,429,438 | 2/1969 | Palmen et al. ................ | 209/137 |

*Primary Examiner*—Antonio F. Guida
*Attorney*—Woodcock, Washburn, Kurtz & Mackiewicz ABSTRACT: A tomato-harvesting machine for severing tomato-bearing stalks with reciprocating cutter bars, elevating the stalks and tomatoes with an inclined conveyor, and separating the tomatoes and the stalks with shaker bars, inclined cleaning belts, and a debris-removing fan. A first of the cleaning belts is positioned between the conveyor and the shaker bears to receive tomatoes previously separated from the stalks and reject soil early in the harvesting process. The second of the cleaning belts is located at an end of the shaker bars remote from the inclined conveyor to receive tomatoes subsequently separated from the stalks by the shaker bars. A transfer belt bridges the gap between the inclined conveyor and the shaker bars above the first cleaning belt to prevent entanglement of any vegetation in the shaker bar mechanism.

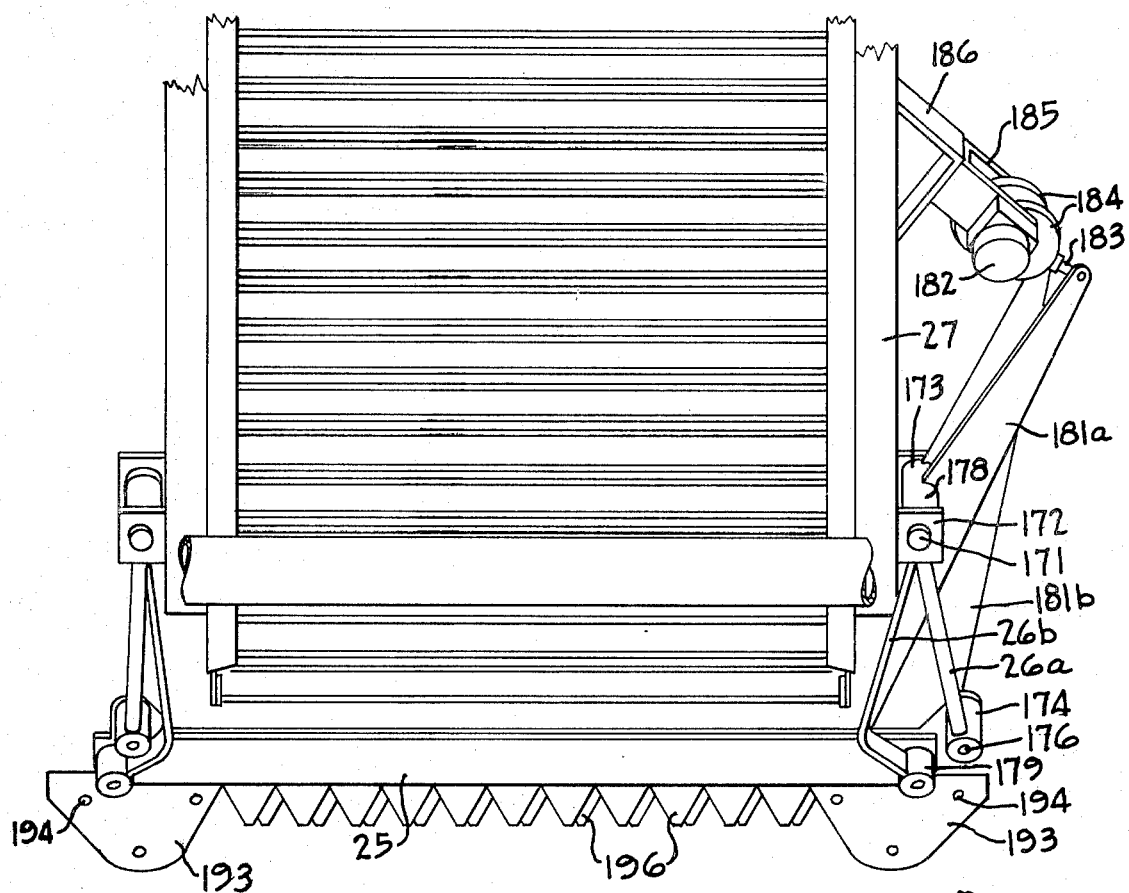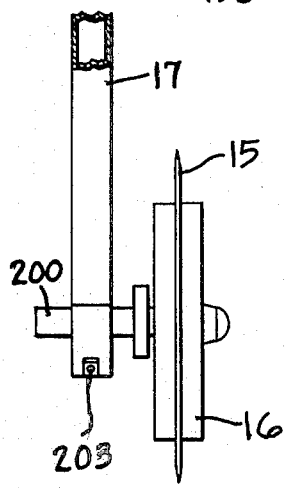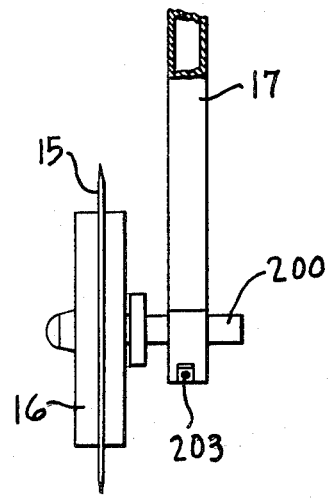
Fig. 5

HARVESTING MACHINE

BACKGROUND OF THE INVENTION

FIELD OF THE INVENTION

This invention relates to mobile harvesting machines, and more particularly this invention relates to mobile harvesting machines for use with tomato crops and the like.

Numerous machines have been developed for harvesting such stalk-borne or vine-borne fruit as tomatoes in recent years in order to obviate the need for costly hand-picking. Generally, these machines have been more or less similar in overall appearance in that they are driven by a tractorlike vehicle, usually comprise a plurality of conveyors, and are provided with means for severing the fruit-bearing stalk at ground level. Not only have there been overall structural similarities between the prior art harvesting machines, but there have also been similarities in their limitations.

For example, the prior art tomato-harvesting machines have generally been limited to successful operation in sandy soils. The primary reason for this limitation has been the inability of these machines to separate sticky soil and debris from the tomatoes. Of course, a machine operating in a sandy soil, such as that characteristic of certain portions of New Jersey and California where the prior art machines have come into extensive use, does not present the machines with the problem of separating sticky debris from the tomatoes. On the contrary, the sandy soil of those areas is not at all sticky and is readily removed with accompanying debris from the tomatoes. However, a sticky, loamy soil such as that characteristic of certain parts of Pennsylvania tends to make the separation of the debris from the tomatoes much more difficult due to the sticking of the debris to the tomatoes. Consequently, the prior art techniques of attempting to merely blow the debris clear of the tomatoes is just not satisfactory where the sticky nature of the soil creates considerable adherence between the debris and the tomatoes. Furthermore, a sticky, loamy soil frequently results in large lumps or balls of soil which are the size of tomatoes and may be mistaken for tomatoes in the sorting of tomatoes unless these balls of soil are broken up. The prior art machines, and particularly their tomato stalk-severing means, have been unsuitable for breaking up these balls.

The prior art has also been unadaptable to a sticky soil for the reason that soil has not been rejected early in the harvesting process. Actually, when soil is sandy, there is no need for such an attempt since a sandy soil will tend to sift out of the stalks and the tomatoes more or less on its own. Consequently, a final cleaning step, after agitation of the tomatoes and the stalks, is adequate to complete the cleaning and removal of the sandy soil from the tomatoes; but if the soil is sticky, the soil will not sift out on its own and the single cleaning attempt at the end of the harvesting process is not adequate.

Not only has the prior art failed to provide means for rejecting soil early in the harvesting process, but the prior art has also failed to segregate loose tomatoes or tomatoes which have been previously separated from their stalks before the loose tomatoes reach the agitating means. By so failing, the prior art has required all tomatoes to pass through rigorous agitation whether or not agitation is required of all tomatoes, thereby increasing the likelihood that the loose tomatoes will be bruised.

SUMMARY OF THE INVENTION

It is an object of this invention to provide for the harvesting of stalk-borne or vine-borne fruit grown in a sticky, loamy soil.

In accordance with this object of the invention, soil is rejected early in the harvesting process. This may be accomplished by providing an opening for soil rejection in the area of communication between the inclined conveyor and the agitating means which receives a certain amount of soil and loose fruit; i.e., fruit which had been previously separated from the stalks. As the loose fruit and soil pass through the opening, they fall to an inclined cleaning belt having an upward component of velocity in a direction opposite to the force of gravity and having a sufficient angle of inclination and appropriate velocity to permit loose fruit to roll downwardly along the cleaning belt while debris, including soil and plant material, is moved upwardly on the cleaning belt. The fruit which continues to cling to the stalks along with any debris which fails to pass through the opening to the inclined conveyor is moved along to the agitating means by a transfer conveyor belt. The transfer conveyor belt serves the dual function of defining the opening to the cleaning belt and guarding the drive mechanism of the agitating means to prevent jamming thereof by debris.

In further accordance with this object of the invention, another inclined cleaning belt is utilized at the end of the agitating means remote from the inclined conveyor. The other inclined cleaning belt also has an upward component of velocity in a direction opposite to the force of gravity and has a sufficient angle of inclination and appropriate velocity to permit the fruit separated from the stalks by the agitating means to roll downwardly along the inclined cleaning conveyor belt while debris, including plant material, is moved upwardly therealong.

In still further accordance with this object, the separation of the fruit from the debris is facilitated by a current of air moved upwardly along each of the inclined cleaning belts to facilitate the movement of debris upwardly and away from the downwardly rolling fruit.

BRIEF DESCRIPTION OF THE DRAWINGS

This and other objects will be more apparent after referring to the following specification and accompanying drawings in which:

FIG. 5 is a partial top plan view of the machine at the cutter bars;

DESCRIPTION OF THE PREFERRED EMBODIMENT

Figure 1:
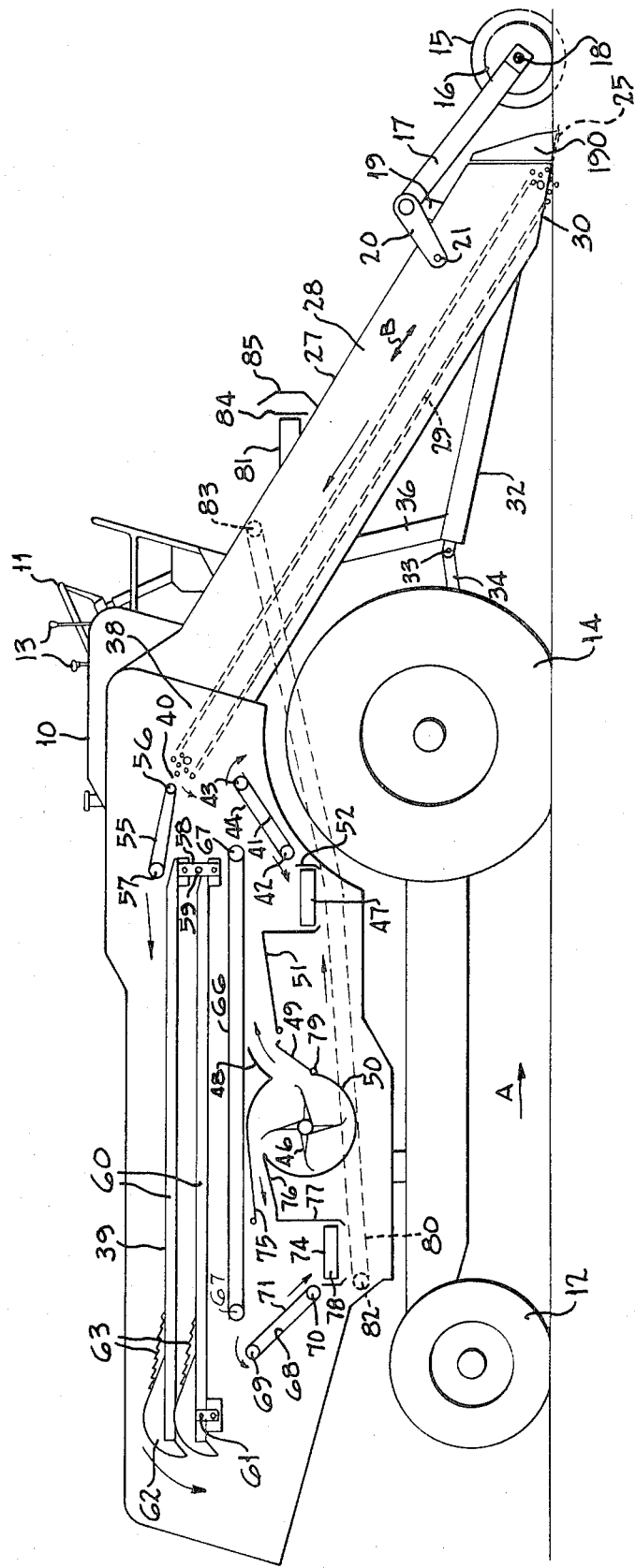
FIG. 1 is a partially schematic representation of the operation of a harvesting machine.

Referring first to FIG. 1, there may be seen the outline of a tomato-harvesting machine and a partially structural and partially schematic showing of the operation of the machine. In overall appearance, the machine resembles a tractor having an operator's control area 10 including a steering wheel 11 operatively connected to steered wheels 12, only one of which is shown, and additional controls 13 along with floor controls not shown. The floor controls are of the conventional type and capable of controlling the transmission of power to drive wheels 14, only one of which is shown. When the machine is engaged in the harvesting operation, the drive wheels 14 lead the steered wheels 12 to provide a direction of operation indicated by an arrow A.

With the machine having a forward direction, as indicated by the arrow A, first contact with the vegetation to be harvested is made by a pair of colters 15 mounted on gauge wheels 16, only one of each being shown. The colters 15 which have rather sharp circular edges serve to cut a swathe through the vegetation to definitely separate the row being harvested from the remainder of the crop. The depth of penetration of the colters 15 is controlled by the gauge wheels 16 which have substantially flat circular surfaces, permitting the gauge wheels 16 to ride over the ground level.

Colters 15 are mounted at one end of each of the support members 17 along axes 18 and the other end of the support members 17 remote from the colters 15 are mounted on a frame member 19 in conjunction with the adjustable linking arm 20. By moving end 21 of the adjustable linking arm 20 along either direction indicated by arrow B, the position of the colter 15 is adjusted, raised or lowered, with respect to the ground level.

After the vegetation has been severed by the colters 15 in planes substantially perpendicular to the ground level, the vegetation is severed in a plane substantially parallel to the ground level by a pair of reciprocating cutter bars 25 which are shown in phantom. As will be described in further detail subsequently, each of the cutter bars 25 is supported at each end by a pair of pivot arms, not shown, which are free to move through arcuate paths substantially parallel to the cutting surfaces of the cutter bars 25 in order to achieve the necessary reciprocating motion. If the pivoting arms are left exposed to the vegetation which is severed by the cutter bars 25 as the harvesting machine moves forward in the direction indicated by the arrow A, the pivoting arms would become jammed by that vegetation. Accordingly, divider shields 190 are provided which have a convex surface facing forward toward the colters 15 and a concave surface which houses the pivoting arms facing rearward toward the drive wheels 14.

The vegetation, stalks and tomatoes are now ready to move up an elevator chute 27 having walls 28 on an inclined conveyor means 29 which has been shown in phantom. As presently shown, the elevator chute 27 is in the harvesting position, that is, forward end 30 of the chute 27 is in the lowermost position so that the cutter bars 25 and the colters 15 are at ground level or below. The lowermost position is achieved when a hydraulic piston 34 and a hydraulic cylinder, not shown, are in the retracted position as shown. However, when it is desirable to raise the forward end 30 to an elevated position such as when the machine is in transit, the piston 34 and the cylinder, not shown, will be extended. Since a pin 33 at the end of the piston 34 couples the piston 34 to frame members 32 and 36, extension of the piston 34 and the cylinder will result in an arcuate upward motion of the frame members 32 and 36, both of which are affixed to the chute 27 so as to effect the raising thereof.

The vegetation is now moved upwardly as indicated on the inclined conveyor means 29. Although the angle of inclination of the chute 27, and thus the inclined conveyor means 29, is of the order of 30° with respect to ground level and, therefore, not exceedingly steep, it is nevertheless necessary to provide the elevator conveyor means 29 with a surface of a character capable of preventing loose tomatoes from rolling down the elevator conveyor means before reaching the upper end 38 thereof. For this purpose, it has been found that a draper chain having horizontally extending rods 37 mounted in two different planes will provide the necessary surface. After the vegetation has reached the upper and rearward ends 38 of the inclined conveyor means 29, the vegetation moves into an area of communication between the inclined conveyor means 29 and an agitating means 39. This area of communication is important in accomplishing various objects of this invention.

In accordance with the object of the invention, the area of communication presents an opportunity to reject considerable debris including sticky soil early in the harvesting process. The rejection is accomplished by providing an opening 40 through which the soil and debris may fall. The fall of the soil is broken by an inclined cleaning belt 41 which is carried by a lower and rearward pulley 42 and an upper and forward pulley 43, both of which are appropriately driven to impart a generally upward movement of the upper surface 44 of the belt 41, as indicated. More specifically, the upper surface 44 will have an upward component of velocity in a direction opposite to the force of gravity. The motion of the belt 41 with this upward component of velocity in combination with the substantially coincident flow of air provided by a paddle wheel fan 46, as indicated, will force the soil and debris upwardly along the upper surface 44 and out through an opening above the upper pulley 43 and below the upper end 38.

In further accordance with the object of the invention, means are provided for removing loose fruit before reaching the agitating means 39. In this connection, the opening 40 permits the loose tomatoes to fall therethrough before the loose tomatoes have a chance to reach the agitating means 39 where they might be subjected to bruising. However, in order for the loose tomatoes to reach a cross conveyor 47 located beneath and at one side of the lower pulley 42, it is necessary for the belt 41 to operate somewhat differently on the loose tomatoes than on the soil and debris. Accordingly, the angle of inclination of the belt 41 must be sufficiently great so as to force the loose tomatoes to roll downwardly therealong rather than being carried upwardly with the soil and debris. It has been found that an angle of inclination of approximately 25° to 35° and a velocity of 132 feet per minute for the belt 41 is appropriate to achieve effective cleaning while permitting the tomatoes to fall to the cross conveyor 47 if air velocity over the upper surface 44 of the belt 41 is of the order of 2,400 feet/minute. In order to achieve the appropriate velocity and direction for the flow of air, directional fins 48 and 49 are provided on a fan housing 50 along with partitions 51 and 52. Preferably, the cleaning belt 41 is of a relatively smooth texture to permit the loose tomatoes to roll down to the conveyor.

In order to prevent the jamming of drive means associated with the agitating means 39 by vegetation and debris which fails to fall through the opening 40 to the belt 41, a transfer conveyor belt 55 is provided. The belt 55 serves essentially as a bridge for the vegetation between the upper end 38 of the inclined conveyor means 29 and the agitating means 39. In order to achieve this bridging function while simultaneously protecting drive means associated with the agitating means 39, the belt 55 has a slight angle of inclination from the forward end supported by a forward pulley 56 to the rearward end supported by a rearward pulley 57. With this angle of inclination, the belt 55 is able to carry the vegetation up above the drive means 58 associated with the agitating means 39 located beneath the pulley 57. In this, the preferred embodiment, the drive means 58 comprises a crankshaft 59 for driving the agitating means 39 comprising shaker bars 60. A similar crankshaft 61 drives the other end of the shaker bars 60. In order to prevent the crankshaft 61 from becoming jammed with vegetation, crank shields 62 are provided along with jagged inclined surfaces 63 to carry the vegetation over the crankshaft 61.

As the shaker bars 60 are driven by the crankshafts 59 and 61 through an oscillating motion, the vegetation will be agitated to the extent necessary to break loose the tomatoes which have clung to the stalks. In addition, the peculiar nature of the shaker bar oscillating motion achieved by crankshaft rotation as indicated will impart a substantial rearward movement to the vegetation carrying it from the forward end adjacent the crankshaft 59 toward the rearward end adjacent the crankshaft 61. During the course of this movement toward the rearward end of the shaker bars 60, the clinging tomatoes will be shaken free of their respective stalks and dropped through the shaker bars 60 near the forward end thereof. Other tomatoes will cling more tenaciously to their stalks and will not drop through the shaker bars 60 much before the tomatoes reach the rearward end thereof.

Since the tomatoes must be collected over a substantial expanse provided by the shaker bars, a shaker collector 66 is provided. The conveyor 66 is carried beneath the collector bar by a pair of spaced pulleys 67 of substantial length so as to extend the full width of the conveyor 66 which is substantially coextensive with the overall width of the combined shaker bars 60. The rotation of the pulleys 67, as indicated, imparts a motion to the conveyor 66 carrying the tomatoes and a certain amount of accompanying debris away from the cleaning belt 41 which is located near the forward end of the machine and toward a similar cleaning belt 68 located near the rearward end of the machine.

The belt 68 is substantially identical to the belt 41 in that it is carried by an upper pulley 69 and a lower pulley 70 which rotate in a direction indicated to impart a generally upward motion to an upper surface 71. In other words, the upper surface 71 has an upward component of velocity in a direction opposite to the force of gravity. Like the belt 41, the belt 68 also is inclined at an angle of approximately 30° to 50° with respect to the ground level, though inclined rearwardly rather than forwardly, and preferably moved at an overall velocity of approximately 132 feet per minute. Also like the cleaning belt 41, the cleaning belt 68 has a relatively smooth texture to permit the tomatoes to roll downwardly to the lower end of the upper surface 71 to a cross conveyor 74 while debris is carried upwardly along the upper surface 71 to and over an upper end thereof with the assistance of forced air moving in a direction substantially coincident with the direction of movement of the upper surface 71 and at a velocity of 2,400 feet/minute.

The means for forcing the air of the belt 68 is also the fan 46 in combination with the housing 50 and fins 75 and 76. Fin 76 includes an integral partition 77 which in combination with a partition 78 provides a substantially closed chamber except for the opening between the pulley 67 and one of the pulleys 69. Note that the amount of air forced between the fins 75 and 76 may be increased by restricting the opening between the fins 48 and 49. In order to permit this restriction in an adjustable fashion so as to control the relative amounts of forced air flowing over the upper surface 71 and the upper surface 44, the fin 49 is hinged along a line 79.

Tomatoes substantially free of all debris including soil and plant material are moved along the cross conveyors 47 and 74 in a direction indicated. Since the cross conveyors 47 and 74 will be receiving the tomatoes from the full width of the cleaning belts 41 and 68, the overall length of the cross conveyors must be at least as great as the width of the cleaning belts. When the tomatoes reach the ends of the cross conveyors 47 and 74, the tomatoes fall to a collector conveyor 80 which is shown in phantom.

Because it is desirable in the preferred embodiment of the invention to actually sort the tomatoes on the machine itself, there has been provided an inclination to the collector conveyor 80 which permits the tomatoes to achieve a certain amount of elevation prior to reaching the sorter conveyor 81 located near the forward end of the machine. Accordingly, a rear sprocket cylinder 82 and a forward sprocket cylinder 83 are mounted at different elevations, the forward cylinder 83 being higher than the rear cylinder 82. In order to accommodate this inclination of the collector conveyor 80, the cross conveyors 47 is located slightly higher than the cross conveyor 74.

After the tomatoes fall from the collector conveyor 80 to the sorter conveyor 81, they move in a direction required by the indicated motion of the sorter conveyor 81. Wall members 84, only one of which is shown, extend laterally the lateral sides of the sorter conveyor to hold the tomatoes thereon. A portion of a sorter guard 85 to protect manual sorters is seen alongside the one wall member 84. A space is provided between the wall member 84 and the sorter guard 85 through which unripe tomatoes may be dropped by the manual sorters.

Figure 2:
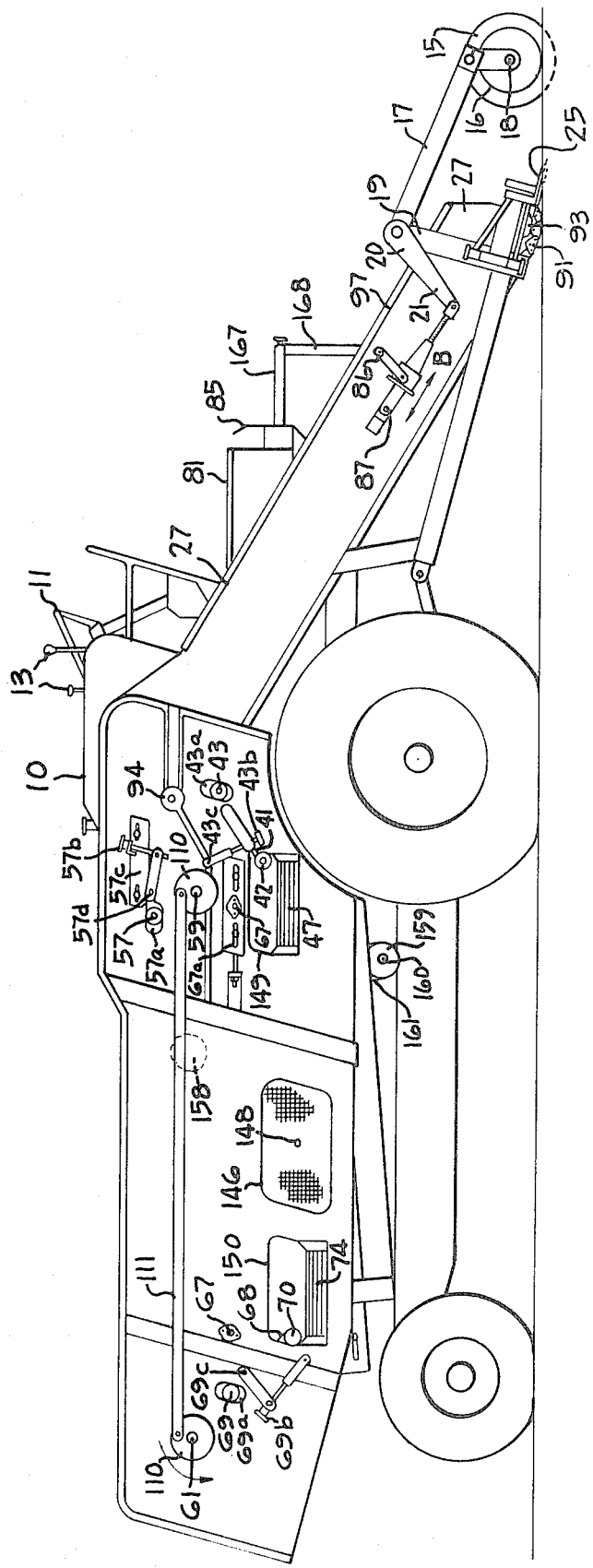
FIG. 2 is a side top plan view of the machine.
Figure 3:
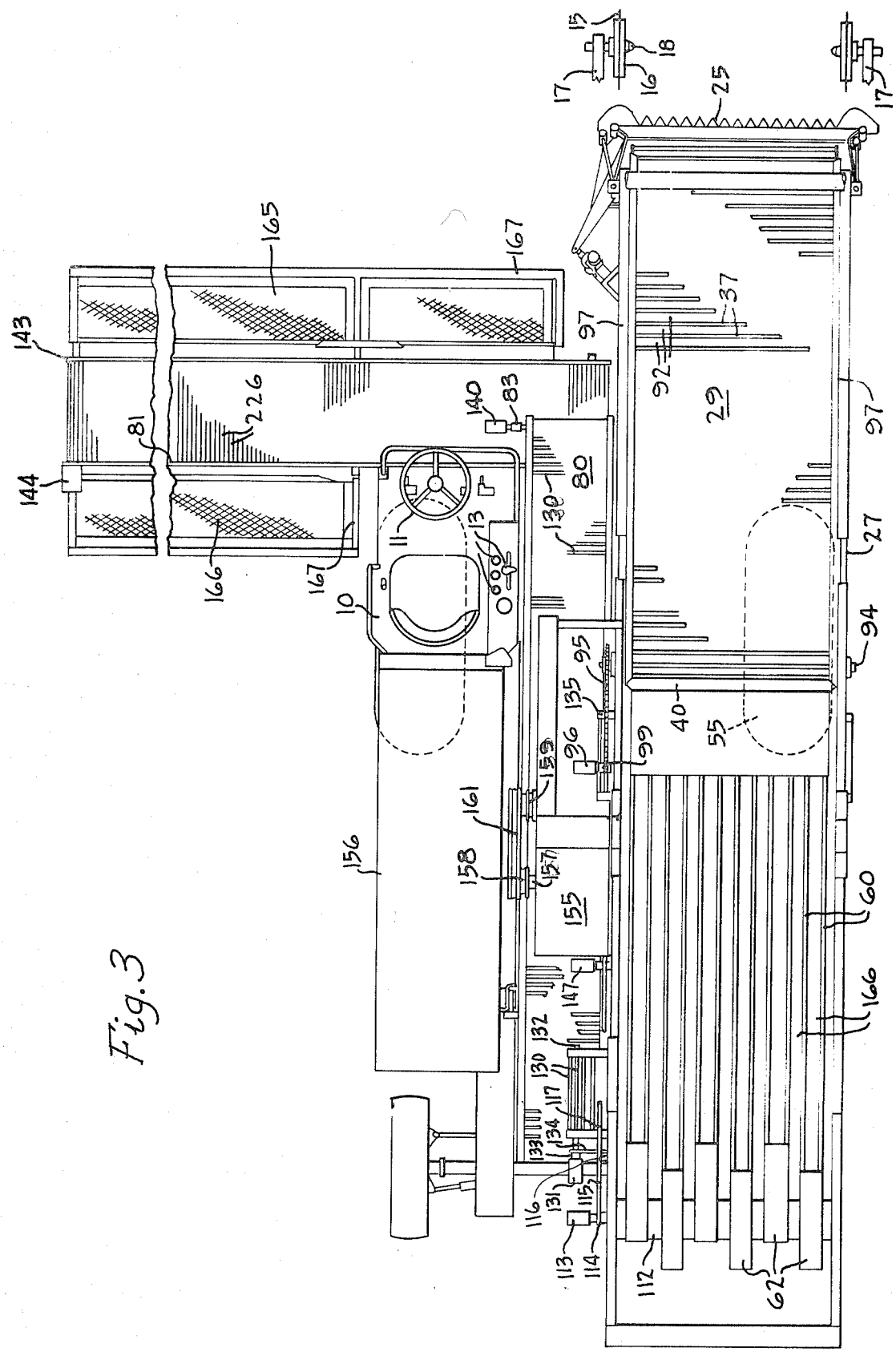
FIG. 3 is a top plan view of the machine.

In order to provide a better understanding of the overall external appearance of the machine, as well as certain operational details, reference is now made to FIGS. 2 and 3.

As shown there, the adjustment of the height of the colter 15 is controlled by a hand crank 86 acting upon the end 21 of the linking arm 20. By converting the circular motion of the crank 86 to a rectilinear motion in a direction indicated by the arrow B by such means as a screw jack and a rack and pinion shown generally at 87, the colter 15 may be raised or lowered with respect to the cutter bars 25.

The inclined conveyor means 29 comprises a draper chain characterized by a plurality of transversely extending rods 37 with alternate rods lying in two different planes. The rods 37 are maintained in these two different planes by two endless series of links 91 supporting the rods 37 therebetween. By supporting the rods 37 in two different planes, elongated pockets 92 are formed which facilitate the movement of vegetation upwardly while being sufficiently narrow to prevent loose tomatoes of a predetermined size, or greater, from falling therethrough. Of course, small loose tomatoes of the size of small stones, small clods of soil, and other small debris will fall through between the rods 37 as is preferred so as to provide early rejection of sticky soil in the harvesting process.

In order to move the vegetation upwardly on the inclined conveyor means 29 between sides 97, drive means are provided around which the endless series of rods 37 passes. The drive provided for the rod 37 is a chain 95 which transmits power from a hydraulic motor 96 to the sprocket cylinder 94.

Unlike the inclined conveyor means 29 which is intended to carry vegetation upwardly including loose tomatoes, the transfer belt 55 in the area of communication between the elevator conveyor means 29 and the shaker bars 60 of the agitating means is not intended to convey loose tomatoes upwardly along the inclination thereof. Rather, the transfer belt 55 which has a substantially smooth surface is intended to provide a sufficiently low coefficient of friction to prevent repose of loose tomatoes thereon near the opening 40, thereby permitting loose tomatoes to fall down through the opening 40. To a substantial degree, a certain amount of loose soil and other loose debris will also fall through the opening 40. The drive for the transfer belt 55 is directly provided by the hydraulic motor 96 which is linked to the pulley 57 through a sprocket coupling 99 which also engages the chain 95 to transmit power to the sprocket cylinder 94.

In order to control the size of the opening 40 and the inclination of the transfer belt 55 and thus the passage of stalks up the transfer belt 55 rather than through the opening 40, adjustable means are provided in conjunction with the pulley 57 as shown in FIG. 2. The adjustable means comprises slots 57a, handwheel 57b which is secured to an adjustable sliding plate 57c and a square-keyed rod 57d which supports the assembly of the belt 55. It will be desirable to vary the size of the opening 40 and the angle of inclination to adjust for various field conditions including stalk size.

The vegetation which does successfully bridge the opening 40 via the transfer belt 55 is vigorously agitated by the shaker bars 60. As will be appreciated by those of ordinary skill in the art, the shaker bars 60 are connected on an eccentric drive means in the form of crankshafts 59 and 61 at each end of the rods 60 with each of the crankshafts synchronized by eccentric drive wheels 110 linked by a rod 111. With the eccentric drive wheels 110 having a rotational motion as indicated, the vegetation will move rearwardly on the shaker bars 60 to the crank shields 62. Each of the crank shields 62 is rigidly connected to a pair of shaker bars 60 so as to move eccentrically with the shaker bars and out of phase with the adjacent crank shields 62. Additional shield members are provided in the form of covers 112 which prevent vegetation from falling through the spaces between adjacent crank shields 62.

Drive means are provided for the crankshaft 61 in the form of a hydraulic motor 113 which is directly connected thereto. By inserting a sprocket coupling 114 between the hydraulic motor 113 and the crankshaft, the motor 113 may also be utilized to drive the cleaning belt 68 as well as the shaker collector conveyor 66 by transmitting power through a drive chain 115 engaging the sprocket wheel 116 on the pulley 69 and a sprocket wheel 117 on the pulley 67.

In order to accommodate various field conditions including field scope, inclination adjustment means are provided in the form of slots 43a and 69a associated with pulleys 43 and 69 along with handwheels 43b and 69b and square-keyed rods 43c and 69c for moving the pulleys 43 and 69 through the slots 43a and 69a. Lateral adjustment means are provided for the collector conveyor belt 66 in the form of a sliding bracket 67a which mounts the forward pulley 67.

The cross conveyors 47 and 74 may be characterized as comprising a plurality of transversely extending rods 130 which are interconnected into endless conveyor means. Both the cross conveyors 47 and 74 are driven off a hydraulic motor 131, the cross conveyor 74 being driven directly by the hydraulic motor 131 through a sprocket cylinder 132 while the cross conveyor 47 is driven through a sprocket wheel 133 coupled between the hydraulic motor 131 and the sprocket cylinder 132, a drive chain 134, and appropriate and conventional power transmission means linked to a sprocket cylinder 135 of the cross conveyor 47.

The collector conveyor 80 is also driven by a hydraulic motor 140 which is directly coupled to the forward sprocket cylinder 83 to provide a forward motion to the endless configuration of a plurality of transversely extending rods 130. The sorting conveyor 81 is driven around sprocket cylinders 143 by a hydraulic motor 144.

In order to provide the necessary drive for the fan 46 which is enclosed behind an intake vent 146, an additional hydraulic motor 147 is provided in a direct driving relationship with a hub 148. When in operation, the fan should provide sufficient movement of the air to keep the cross conveyors 74 and 47 substantially free of debris. If for any reason the cross conveyors 47 and 74 should become clogged or jammed with debris, openings 149 and 150 provide ready access to that debris.

Since all of the conveyor and cleaning means as well as the agitating means 39 and the fan 46 are powered by hydraulic motors, it is necessary to provide conventional hydraulic pumps and reservoir which are enclosed within a housing 155 located above the collector conveyor 80 between the agitating means 39 and an engine housing 156. By utilizing appropriate hydraulic connections in the form of hoses, not shown, the various hydraulic motors may be driven off the hydraulic pumps. The pumps themselves are driven off a shaft 157 which passes into a housing 155. The shaft 157 is in turn driven by means of a pulley 158 which is connected to a pulley 159 and drive shaft 160 of the engine through a belt 161.

Turning now to discuss the sorting function associated with the sorter conveyor 81, it will be better appreciated that the guard 85 serves to protect manual sorters standing on sorting platforms 165 and 166. In order to protect sorters from falling off the platforms 165 and 17, guard railing means 167 and 168 are provided. In addition to providing the support for the platforms 165 and 166, the rods 167 and 168 also serve as railings to protect the workers from falling off the platforms 165 and 166 as the machine moves across a rather bumpy field. It will also be appreciated that the manual sorters may be replaced by an automatic sorting means. If this is done, the long sorter conveyor 81 and the platforms 165 and 166 could be eliminated and a modified sorter conveyor could be substituted along with photosensing sorting means.

Figure 4:
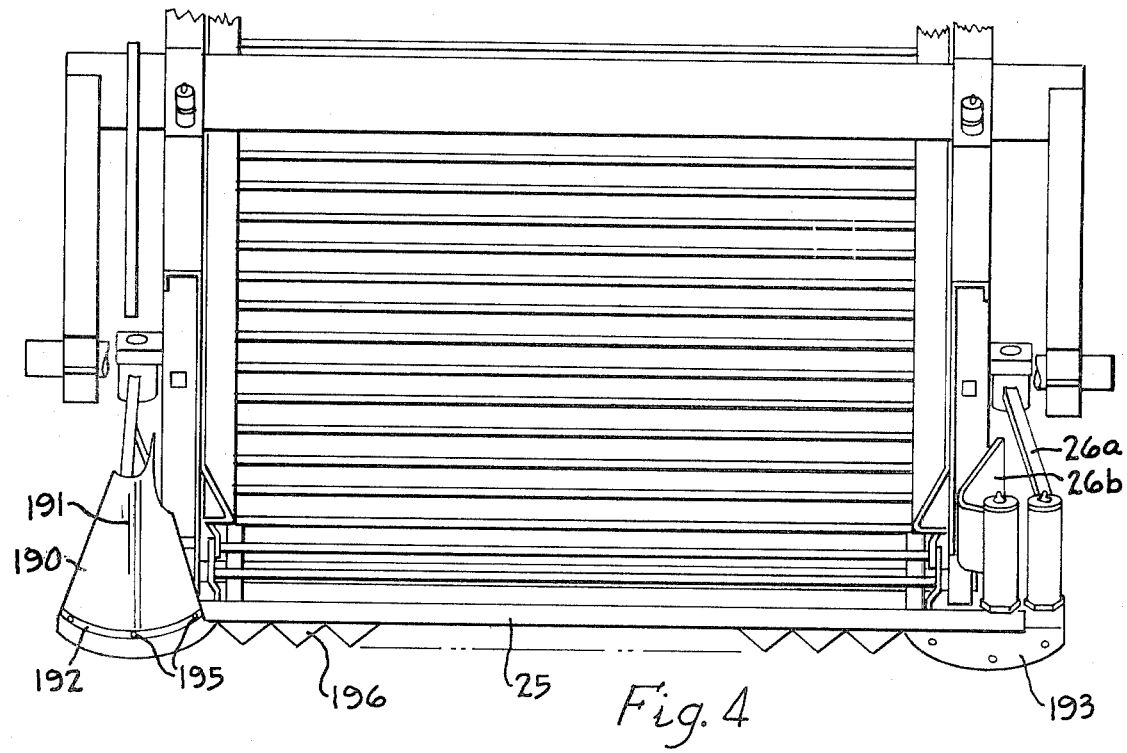
FIG. 4 is a partial front plan view of the machine at the cutter bars.
Figure 6:
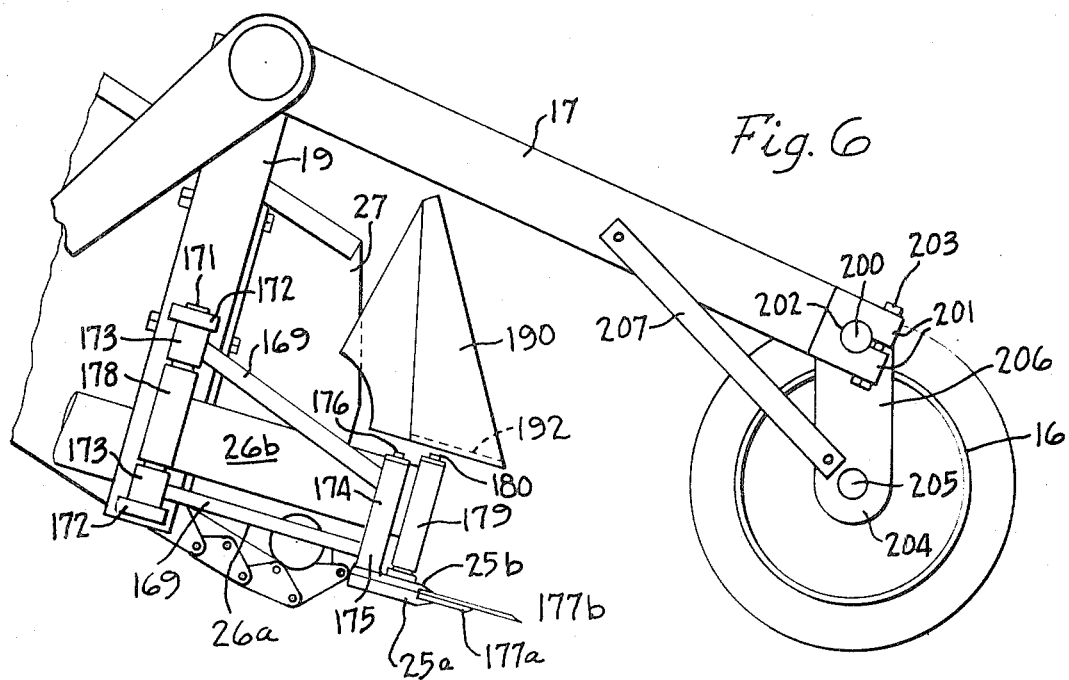
FIG. 6 is a partial side plan view of the machine taken at the cutter bars.

The area of communication between the elevator conveyor means 29 and the ground level may best be understood by reference to FIGS. 4-6. The cutter bars 25 are supported only at the respective ends thereof, so as to provide an unencumbered cutting surface substantially coextensive with the full length of the cutter bars 25 while still obtaining a stable mounting. In this connection, each of the cutter bars 25 is supported by a pair of pivoting arms 26 at each end thereof. Upper and lower pivot rods 169 of the lower pivot arm 26a are pivotally secured to the frame member 19 by a pin 171 affixed to brackets 172 on each side of the elevator chute 27. The rods 169 having integral sleeve members 173 pivoting about the pin 171 establish a substantially limited arcuate motion of an integral sleeve 174 connected to both the rods 169. By connecting a lower end 175 of the sleeve 174 to the lower cutter bar 25a through appropriate means such as a bolt 176, the cutter bar 25a having a cutting surface 177a will be given a substantially reciprocating motion along the ground level.

A similar motion is imparted to the upper cutter bar 25b by pivot arms 26b having an integral sleeve 178 pivotally bearing on the pin 171 and an integral sleeve 179 at the other end thereof secured to the cutter bar 25b by a bolt 180. As is the case with the sleeve 174, the sleeve 179 is also capable of limited but substantially arcuate motion so as to impart a generally reciprocating motion to a cutting surface 177b of the cutter bar 25b. The consequent coaction between the adjacent, parallel and reciprocating cutting surfaces 177a and 177b produces a cutting action on the vegetation at or below the ground level so as to sever the tomato stalks from their respective roots and permit the stalks and tomatoes to be carried upwardly on the inclined conveyor means 29.

The necessary arcuate motion for the sleeves 174 and 179, and thus the necessary reciprocating motion for the cutter bars 25a and 25b, is derived from an extension 181b of the arm 26b and an extension 181a of the arm 26b which operate in conjunction with an eccentric drive means on a hydraulic motor 182. The extensions 181a and 181b which are integral with the sleeves 178 and 173 respectively are pivotally secured to couplings 183 of eccentrically driven discs 184. The discs 184 which are pivotally attached to a crankshaft driven by the motor 182 produce a reciprocation of couplings 183 which is transmitted through the pivoting arms 26 to produce a reciprocation of the cutter bars 25. The motor 182 is rigidly mounted on a forked support 185 between which the discs 184 are carried. An L-shaped bracket 186 is welded to the forked member 185 for support thereof on the side of the elevator chute 27.

If the arms 26 and the associated driving mechanism are left exposed to the vegetation, jamming will occur since the vegetation will become entangled in the mechanism. In order to avoid the problem of jamming, due to vegetation entanglement, shields 190 having substantially rigid convex surfaces facing in the forward direction are associated with the arms 26 at each end of the cutter bars 25. In FIG. 4, one of the shields having a fenderlike appearance with an upwardly and rearwardly extending forward ridge 191 is shown as properly mounted on the upper cutter bar 25b. A lower flange portion 192 is secured to plates 193 which are located at the ends of the upper cutter bar 25b by means of threaded fastening means inserted through apertures 194 in the plates 193 and alignable apertures 195 located in the flange 192. Besides preventing the vegetation from jamming the drive mechanism for the cutter bars 25, the fenderlike and tapering nature of the shields 190 with the ridge 191 serve to guide vegetation severed by the colters 15 into teeth 196 of the cutting surfaces 177a and 177b as they move therewith.

FIGS. 5 and 6 also disclose the independent mounting of the colters 15 and the gauge wheel 16 on independent axles 200. The outer ends of the axles 200 are rigidly mounted at forked ends 201 of the support members 17 by locking an aperture 202 about the axle 200 by means of a nut and bolt combination 203. The inner ends of the axles 200 carry the colters 15 and the gauge wheels 16 at the lower ends 204 of the links 205 while the upper ends 206 are mounted on the axles 200. The angular relationship between the support members 17 and the links 205 is maintained by struts 207 pinned to the links 205 near the axles 200 and midway along the support members 17.

Figure 7:
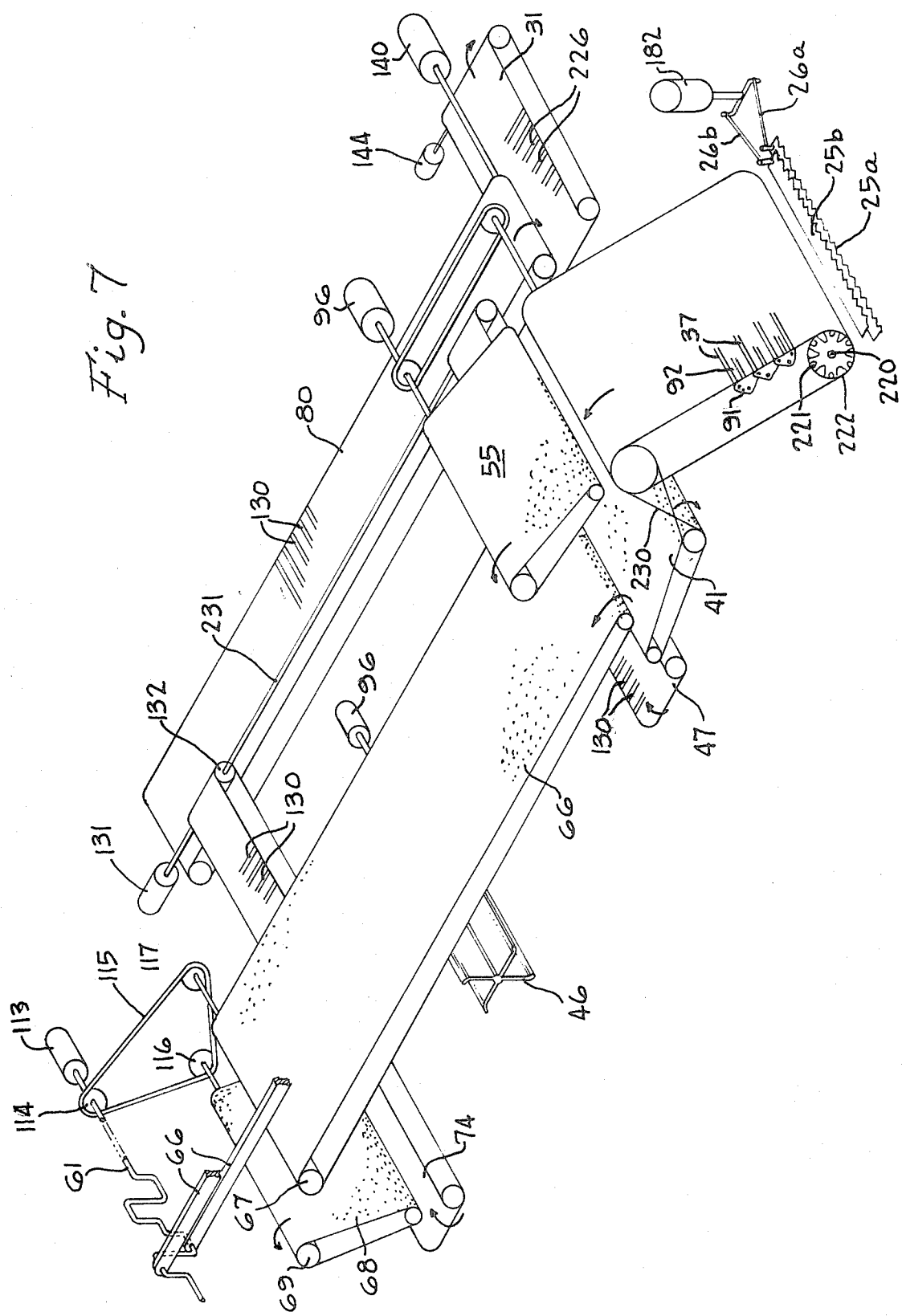
FIG. 7 is a partially schematic perspective view of the various driven and driving elements of the machine.

Because the harvesting process for the tomatoes is essentially continuous and dependent upon the proper interaction of a plurality of conveyor means to maintain the continuity while performing specific steps in the process, it becomes important to specify the interrelationships between the conveyor means and certain aspects of the individual conveyor means. FIG. 7 will now be referred to for that purpose. In order to avoid repetition, those elements previously numerically specified retain that same numerical specification in FIG. 7 even though those elements may be schematically illustrated. For example, the cutter bars 26 comprising the lower cutter bar 25a and the upper cutter bar 25b are shown as driven by the hydraulic motor 182 through the pivot arms 26a and 26b.

The inclined conveyor means 29 may be seen as comprising the links 91 arranged in a schematically indicated endless configuration and supporting the transversely extending rods 37. Note that every other rod 37 is maintained by the links 91 in a substantially uniplanar nature to form the base of pockets 92 receiving the tomatoes while every other rod 37 once removed from the first-mentioned rods 37 is maintained in a substantially uniplanar nature to provide walls for the pockets 92. Sprocket members 220 are so adapted to mate with the rods 37 by providing a first set of elevated recesses 221 which receive the rods 37 forming the walls for the tomato pockets and a lower set of recesses 222 which receive the rods 37 forming the base of the pockets 92.

The transfer belt 55 provides a marked contrast to the rough surface of the rods 37 in that it may be characterized as an endless fabric belt having a relatively smooth outer surface. Similarly, the cleaning belt 41, the cleaning belt 68, and the shaker collector belt 66 comprise a fabric in a generally endless configuration having a relatively smooth exterior surface.

A somewhat different surface is provided on the cross conveyors 47 and 74 along with the collector conveyor 80. Generally, these conveyors comprise a plurality of substantially uniplanar, transversely extending rods 130 arranged in an endless configuration. A similar surface is provided for the sorter conveyor 81 except that rods 226 are of somewhat smaller diameter and more closely spaced.

The necessary synchronization between the cleaning belts 41, 68 and the collector conveyor 66 is achieved by driving pulleys 67 and 69 off the sprocket coupling 114 by a chain 115 and sprocket wheel 116 and 117. The cleaning belt 41 may then be driven off the inclined conveyor 27 by a belt or chain 230 as shown. An appropriate and conventional linkage 231, provides for the common drive of the cross conveyors 47 and 74 off the hydraulic motor 131.

It is extremely important that the respective speeds of the conveyors and belts be maintained within predescribed limits so as to assure proper functioning of the machine in performing the various steps in the harvesting process. In this connection, the following speeds of the respective belts and conveyors are set forth as illustrative:

|  | Ft. per minute |
|---|---|
| inclined conveyor 29 | 69–207 f.p.m. |
| transfer belt 55 | 103–310 f.p.m. |
| cleaning belt 41 | 132 f.p.m. |
| collector conveyor 66 | 60 f.p.m. |
| cleaning belt 68 | 132 f.p.m. |
| cross conveyor 47 | 120 f.p.m. |
| cross conveyor 74 | 120 f.p.m. |
| collector conveyor 80 | 125 f.p.m. |
| sorter conveyor 81 | 38 f.p.m. |

Although the present invention has been described in connection with details of a specific embodiment thereof, it is to be understood that such details are not intended to limit the following claims. Furthermore, the terms and expressions employed are used in a descriptive and not a limiting sense, and there is no intent to deprive the following claims of a full breadth of equivalents.

What is claimed is:

1. A machine for harvesting stalk or vine-borne fruit comprising:
   an elevator means communicating with the ground at a lower end for receiving vegetation and moving said vegetation upwardly to an upper end thereof,
   an agitating means at said upper end for receiving vegetation, said agitating means imparting an agitation to said vegetation capable of separating fruit from plant material,
   a transfer conveyor belt located between the upper end of said elevator means and said agitating means, said transfer conveyor belt being spaced from said elevator means so as to permit loose fruit to fall therebetween while carrying other fruit and plant material onto said agitating means,
   a first means for removing loose fruit falling through the space between said elevator means and said transfer conveyor belt comprising an inclined moving cleaning belt having an upward component of velocity in a direction opposite to the force of gravity, said cleaning belt having a sufficient angle of inclination and appropriate velocity to permit fruit to roll downwardly along said cleaning belt while debris including soil and plant material is moved upwardly on said cleaning belt,
   a collector conveyor belt communicating with and collecting fruit separated by said agitating means, and
   a second means for removing separated fruit from the collector conveyor.

2. The harvesting machine of claim 1 including means for forcing air associated with said cleaning belt, said air being forced in a direction substantially coincident with the direction of movement of said cleaning belt so as to facilitate the removal of debris upwardly away from the downwardly rolling fruit.

3. The harvesting machine of claim 2 wherein said first means and said second means each comprises a conveyor communicating with each said cleaning belt respectively to receive the fruit rolling down each said cleaning belt.

4. The machine of claim 2 wherein the upperside of said transfer conveyor belt is inclined slightly upwardly from the end adjacent said elevator means to the end adjacent said agitating means.

5. The machine of claim 4 wherein the space between said transfer conveyor belt and said elevator means is long and narrow.

6. The machine of claim 5 wherein means are provided for adjusting said transfer conveyor belt to maximize the passage of loose fruit through said narrow space and the separation of debris therefrom.

7. The machine of claim 6 wherein the width of the narrow space between said transfer conveyor belt and said elevator means is adjustable so as to permit maximizing separation of loose fruit from debris.

8. The machine of claim 7 wherein said second means for removing separated fruit comprises another inclined moving cleaning belt having an upward component of velocity in a direction opposite to the force of gravity, said other cleaning belt having a sufficient angle of inclination and appropriate velocity to permit fruit to roll downwardly along said cleaning belt while debris including soil and plant material is moved upwardly on said cleaning belt.

9. The harvesting machine of claim 8 wherein said means for forcing air is also associated with said other cleaning belt, said air being forced in a direction substantially coincident with the direction of movement of said other cleaning belt so as to facilitate the removal of debris upwardly away from the downwardly rolling fruit.

* * * * *